UNITED STATES PATENT OFFICE.

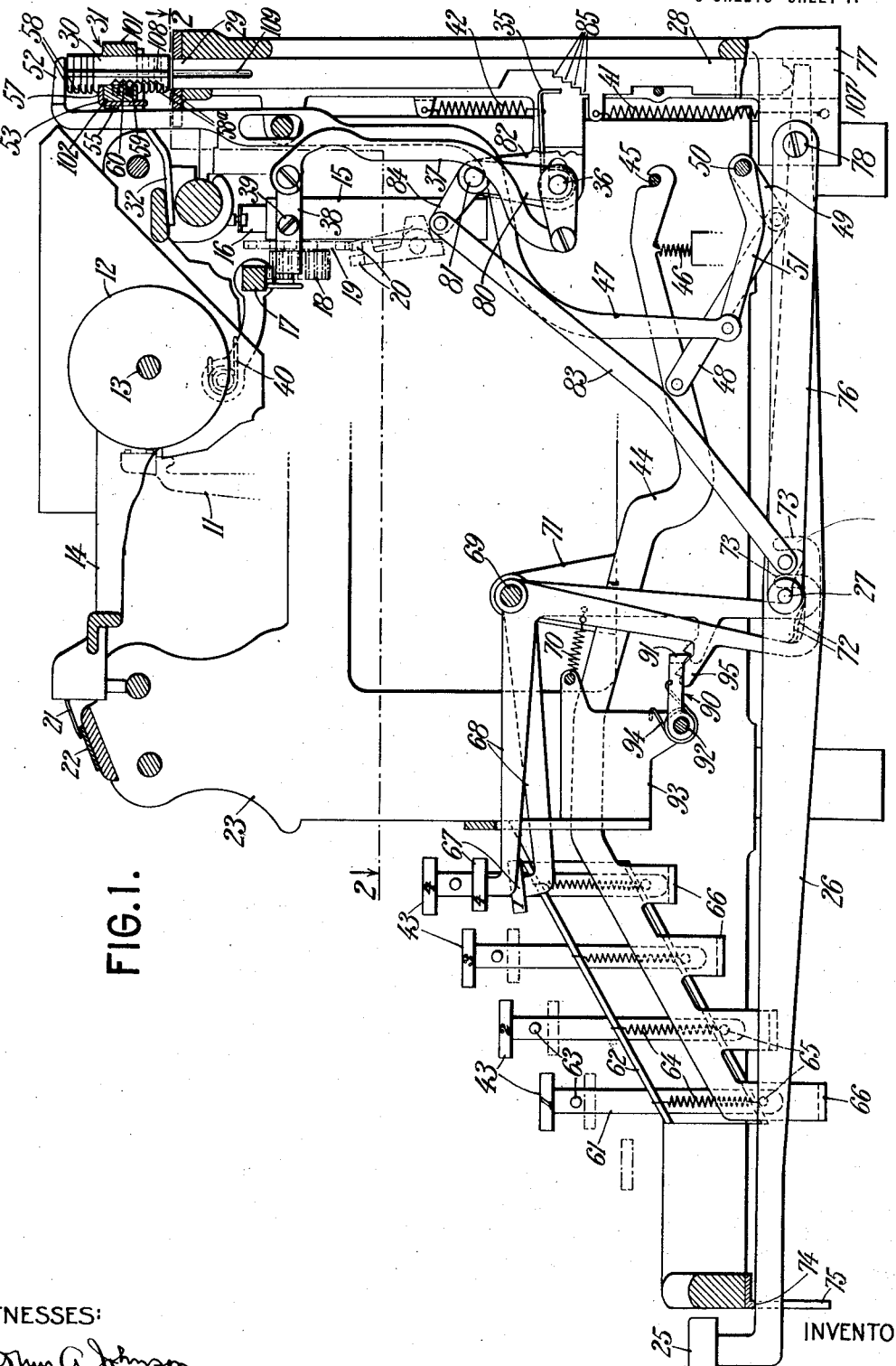

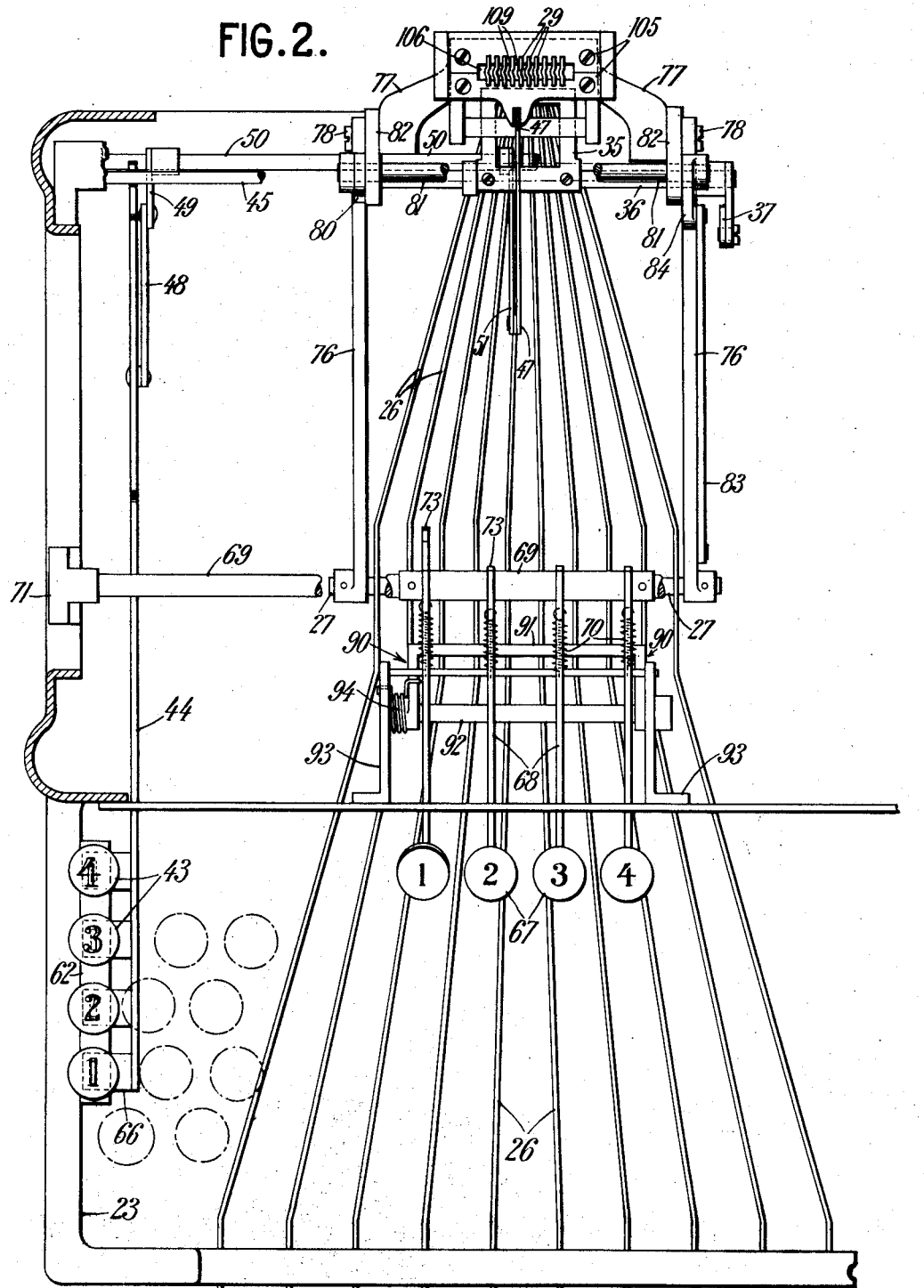

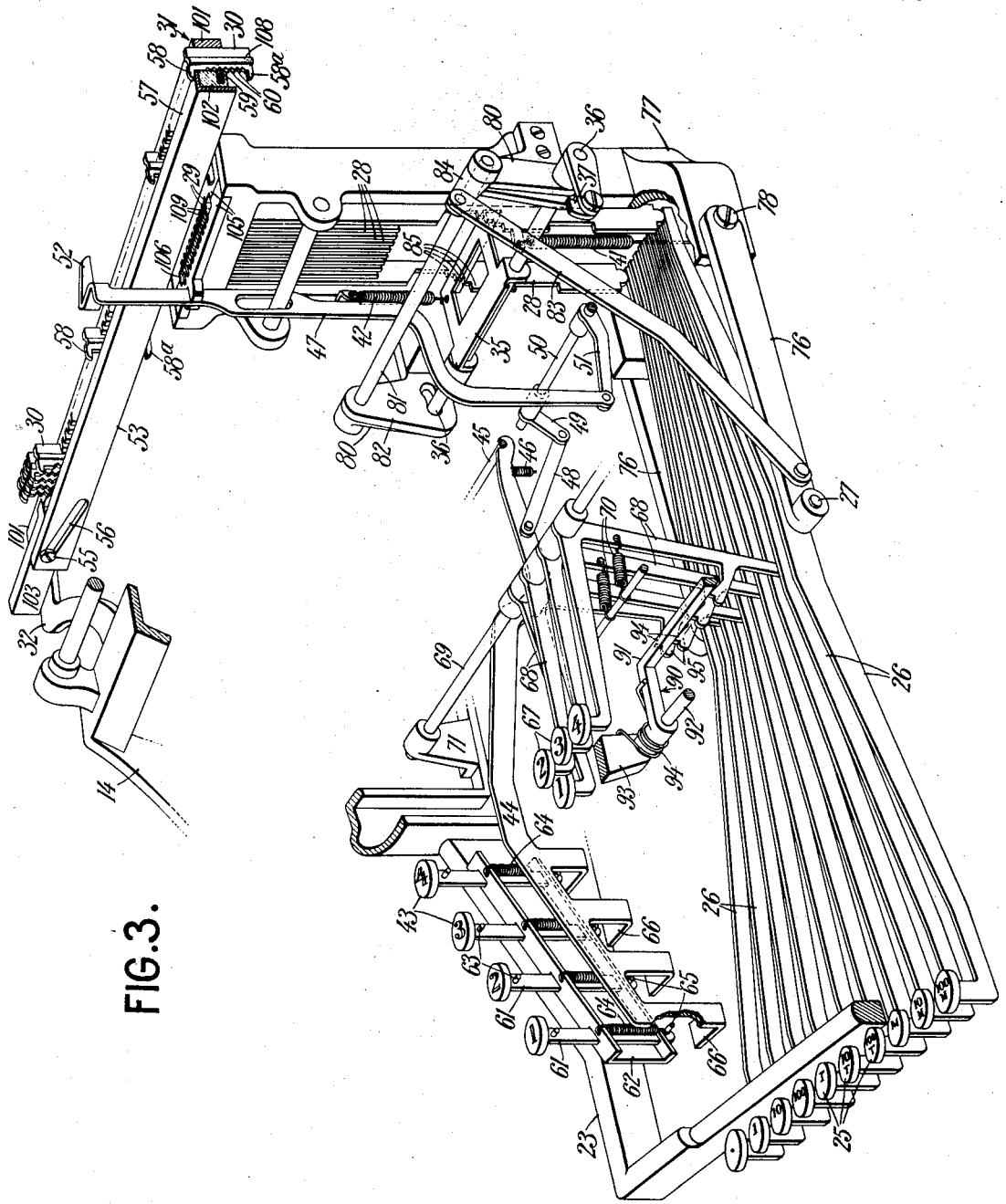

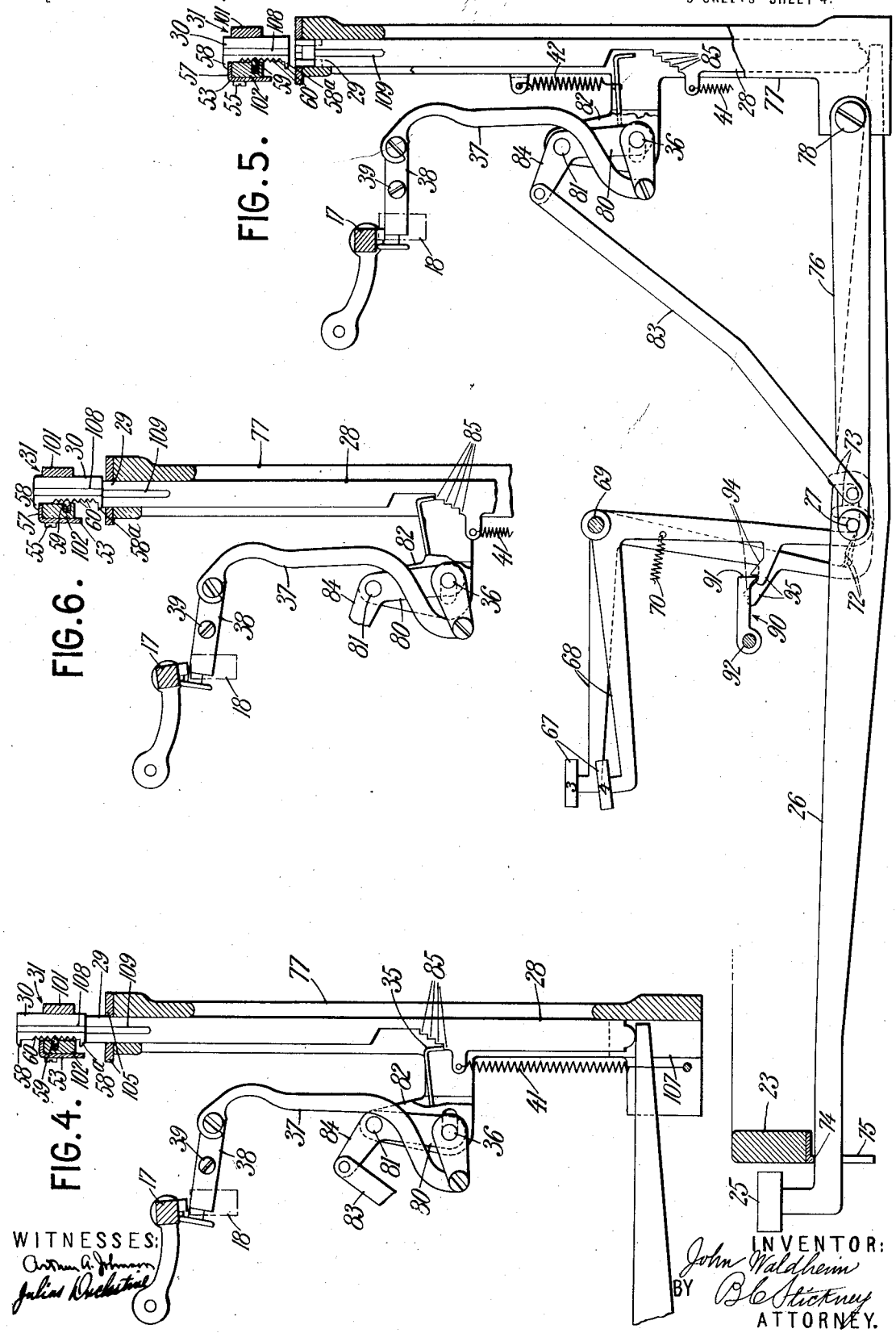

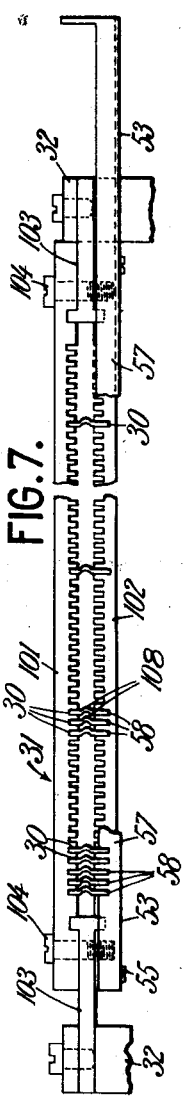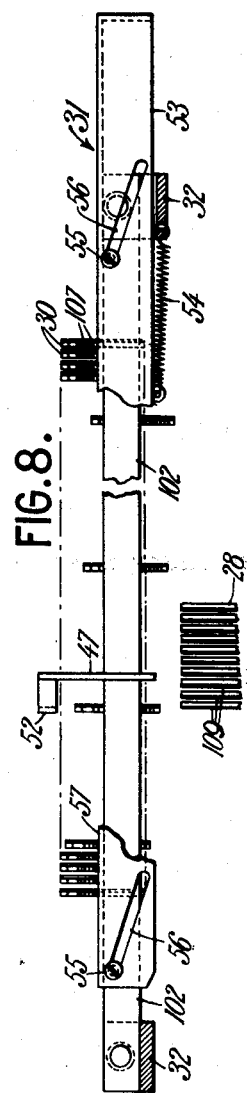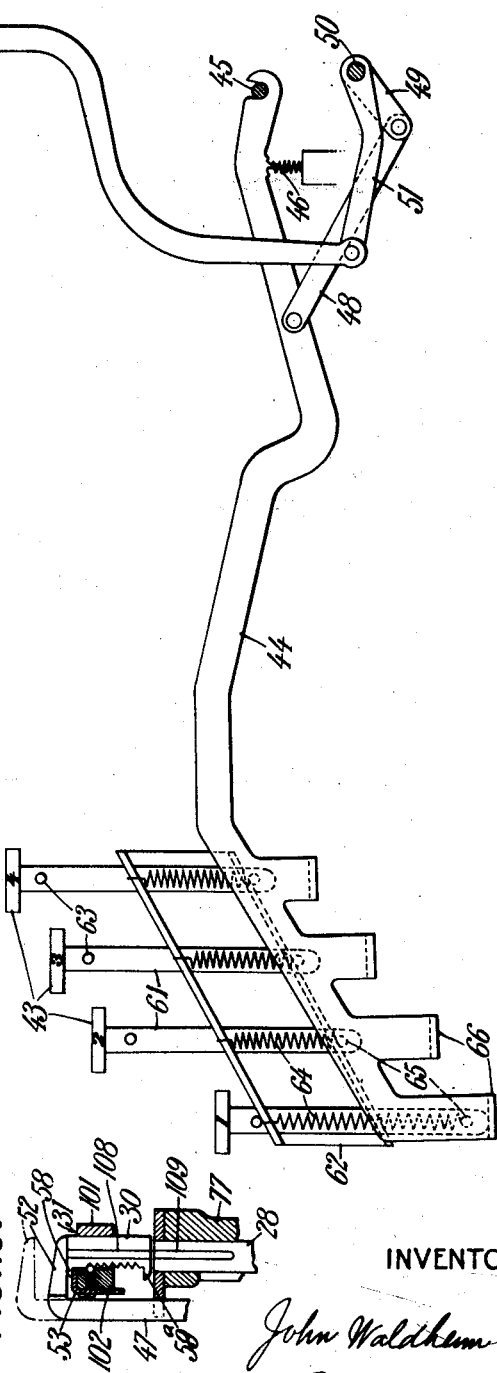

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING-MACHINE.

1,333,690.  Specification of Letters Patent.  Patented Mar. 16, 1920.

Application filed October 31, 1916. Serial No. 128,670.

*To all whom it may concern:*

Be it known that I, JOHN WALDHEIM, a citizen of the United States, residing in Elizabeth, in the county of Union and State of New Jersey, have invented certain new and useful Improvements in Typewriting-Machines, of which the following is a specification.

My invention relates to typewriting machines and more particularly to a tabulating mechanism.

A feature of the present invention is the provision of a key-set device to be used for selectively setting the machine for column-selecting work.

The stops for column-selecting are, according to the preferred manner of practising my invention, set individually in any one of a plurality of effective positions, transversely of the stop-bar, so that, with suitable mechanism to coöperate with the variously adjusted column stops, the carriage may be arrested at any selected columnar position or zone.
An additional feature of the invention is that the carriage may be arrested at any selected decimal point in any selected column or zone.

The key-set column-selecting stop device includes a column-selecting stop for each letter-space position of the carriage, and a key-controlled projector for selectively moving the column-selecting stops to effective positions. Preferably, there is provided a plurality of keys in the key-board for moving the projector through different distances.

The decimal tabulator is of a type, in which a series of pivoted levers coöperate with a series of plungers, the upper ends of the latter comprise denomination stops, which are thrust into the path of the column stops on the stop bar.

To adapt this form of tabulator to column-selecting, I render a fulcrum of the pivoted levers shiftable to any one of a plurality of positions, thus causing one end of the pivoted levers to move the shift and their corresponding plungers to raise or lower denominational stops.

Other features and advantages will hereinafter appear.

In the accompanying drawings,

Figure 1 is a vertical transverse side elevation of the machine showing the parts in normal positions.

Fig. 2 is a sectional top plan view taken on the line 2—2 of Fig. 1, some of the parts being broken away.

Fig. 3 is a perspective view showing the decimal tabulator column-selector and key-set device for column stops.

Fig. 4 is a fragmentary sectional side elevation, showing one of the denomination stops coöperating with a column stop, in the first columnar position of the carriage. The carriage-release universal bar coöperates with one of the steps on the tabulator plunger to effect a release of the carriage at the proper time.

Fig. 5 is a view with the parts in a position similar to Fig. 1, except that column "4" key is shown actuated, and the denomination stops and carriage-release bar, correspondingly shifted to another position.

Fig. 6 is a view similar to Fig. 5, the tabulator plunger being actuated to bring the denominational stop into the path of the column stop, a shoulder on the plunger also engaging with the carriage-release bar.

Fig. 7 is a top plan view of the stop bar with some of the stops removed.

Fig. 8 is a front elevation of the stop bar, showing column stops set in the first, second, third and fourth columnar positions of the carriage. A fragment of the key-controlled projector is shown, also the denominational stops.

Fig. 9 is a sectional side elevation of the key-set mechanism, showing the "1" key depressed to set a column stop in the column "1" position.

Fig. 10 is a fragmentary sectional side elevation, showing a column stop, set by the projector to the column "4" position.

The typewriting machine is of the regular Underwood construction, of which type-bars 11 swing upwardly and rearwardly to print against a cylindrical platen 12, which rotates on an axle 13, in a carriage 14, which is driven from right to left of the machine by a spring drum 15, connected thereto by a strap 16. The letter space movements of the carriage are controlled by a suitable escapement mechanism, having for this purpose, a normally engaged rack 17, which meshes with a pinion 18, connected to the escapement wheel 19, the latter engaging with the reciprocating dogs 20, which are actuated during printing operations by typebars 11 and a universal bar (not shown).

To indicate the letter space position of the carriage, there is provided a pointer 21, on the carriage 14, to coöperate with a scale 22, the latter being fixed on the frame 23 of the typewriting machine.

The decimal tabulator comprises a series of keys 25, each of which, when depressed, swings a lever 26, of the first order, about a fulcrum 27, to cause an upward movement of a plunger 28, with which the rear end of the lever 26 engages. A denominational stop 29, comprising the upper end of the plunger 28, is thus moved into the path of a column stop 30, carried by a stop bar 31; the latter being secured to the typewriter carriage by brackets 32.

The carriage is released during tabulating operations, by the plungers 28, which engage with a universal bar 35, which swings about a fulcrum 36, to cause a downward pull on the link 37, and rock a release lever 38 about its pivot 39, thus lifting the pivoted rack 17, against the tension of a spring 40, out of engagement with the escapement pinion 18. After the disengagement of the rack 17 from the pinion 18, the carriage is free to run from right to left of the machine, under the influence of the spring drum 15, until it is arrested by one of the column stops 30, engaging with the actuated denominational stop or coöperative stop 29.

Restoring springs 41 and 42 are provided for returning the tabulator plungers and carriage release mechanism respectively, to their normal positions, the spring 42 being in effect weaker than the spring 40, but being strong enough to hold the universal bar 35 normally clear of heels 85.

The key-set mechanism comprises a key 43, which, when depressed, swings a lever 44 about a fulcrum 45, against the tension of a spring 46, to cause a downward movement of a stop-setting element or plunger 47. The connection between the lever 44 and the plunger 47 comprises a link 48, connected to an arm 49, located near the left-hand side of the machine and secured to a rock shaft 50, and a second arm 51 located near the center of the machine. The upper end of the plunger 47 is provided with a finger 52, the relative position of which with respect to the denominational stops, is as indicated in Fig. 8.

The column stops, of which there is one on the stop bar for each letter space position, are normally in their uppermost positions. When it is desired to set any selected column stop to an effective position, the carriage is located by means of the pointer 21 and scale 22, at any desired columnar position or zone, thus locating the selected column stop under the finger 52. The key 43 is then actuated, to move downwardly the stop-setting element or plunger 47, thus moving, by means of the finger 52, the column stop 30 to an effective position.

To restore the stops 30 to their ineffective or neutral position on said bar, which is necessary before setting up a new combination of stops, there is provided on the stop bar 31 a manually-controlled stop-restoring slide 53 (Figs. 1 and 8), which is moved leftwardly on the stop bar, against the tension of a spring 54, to cause an upward movement thereof, by means of shouldered screws 55 and cam slots 56. A stop-engaging portion 57 of the slide 53 underlies fingers 58 of the stops 30; thus, when the slide moves upwardly, the set column stops are moved therewith, until arrested by a second finger 58ª, formed near the lower edge of the stops 30, and coöperating with the underside of the stop bar 31.

To hold the stops 30 in any position to which they may be set, there is provided for each stop, a spring-pressed ball 59, which drops into notches 60 formed on the stop 30.

I have provided several keys 43, to coöperate with the lever 44, to move it selectively through different angular distances, thus transmitting a variable movement to the finger 52 of the stop-setting element 47, to set any one of the stops 30, selectively, to any one of a plurality of positions transversely of the stop bar. The keys 43 are provided with key-stems 61, which are guided in suitable slots formed in a U-shaped plate 62, secured to the left-hand side of the machine frame 23 (Fig. 3), in any suitable manner. The keys 43 have a uniform movement, which is limited by stop pins 63, engaging with the top part of the U-shaped plate 62. The keys move against the tension of springs 64, attached at one end to the plate 62, and at the other end to stop pins 65 on the key-stems 61, and engaging with the under side of the plate 62.

The stems 61 engage with bent-off fingers 66, on the lever 44, to move the latter through different distances, there being a lost motion between some of the stems and their coöperating fingers for this purpose. In the drawings I have shown four keys; thus, any stop 30 can be set to any one of four positions, the position of the latter being dependent upon the key depressed. The four effective positions of the column stops 30 are indicated in Figs. 1, 3 and 8. Referring to Fig. 8, it will be seen that the stops are set, from left to right, in the first, second, third and fourth columnar positions. It will also be seen that the lower ends or engaging portions of these stops are arranged in stepped relation with respect to each other. It will further be seen, that by varying the normal positions of the coöperative or denominational stops 30, by suitable mechanism, which will be presently described, and by moving the denominational stops through the same distance, when actuated by the key 25, any one of the denominational stops can be brought selectively into engagement with any one of the set column stops.

The column-selector comprises a plurality of keys 67, there being one key for each columnar position of the carriage; each key, when depressed, swings a bell-crank lever 68, associated therewith, about the fulcrum rod 69, against a tension spring 70, the fulcrum rod 69 being supported by brackets 71. To select a columnar position of the carriage, the key 67 representing the desired column, is depressed, thus raising or lowering, according to the position previously occupied, the fulcrum 27 of the tabulator key levers 26, by means of a cam 72, at the lower ends of the bell-crank lever 68. The return movement of the bell-crank levers 68 is limited by fingers 73 thereon, which engage with the fulcrum rod 27. By raising or lowering the fulcrum 27, the tabulator key levers 26 are rendered effective, as levers of the third order, to swing about the fulcrum 74, formed at the upper ends of slots in the usual guide plate 75, the rear ends of the key levers being raised or lowered to move the denominational stops 29, formed at the upper ends of the plungers 28, to the selected columnar position. The fulcrum rod 27 forms part of a swinging frame or bail, comprising arms 76, pivoted on the tabulator brackets 77 by shoulder screws 78.

It should be understood that the motion transmitted to the plungers 28 by the tabulator keys 25 is always the same, and that the normal positions of the plungers 28 are varied as indicated in Figs. 1 and 5. Thus after the plungers have been set to the proper normal position, if a key 25 is then actuated, the denominational stop will be moved into the path of a predetermined column stop.

To insure the same over-lap between the column stop 30 and the coöperative stop or denominational stop 29, irrespective of the column position of said coöperative stop, before releasing the carriage during tabulating operations, I shift the universal or carriage release bar 35, to different positions while shifting the fulcrum 27. To accomplish this, I have floatingly supported the fulcrum-rod 36 of the universal bar 35, in a swinging frame, comprising arms 80, secured to a rock shaft 81 and pivoted on brackets 82, secured to the tabulator brackets 77. Connection from the rock shaft 81 to the fulcrum-carrying frame, which comprises the fulcrum rod 27 and arms 76, is made by a link 83, connected to one of the arms 76 and to an arm 84 extending from the rock shaft 81. Each plunger is provided with a series of steps or engaging portions 85, the universal bar 35, being shiftable into engagement with any one of said engaging portions according to the column-selector key actuated.

In Figs. 1 and 5, it will be seen that the plungers 28 are set in their column "1" and column "4" positions, respectively, and that the universal bar is in a position to be engaged by the lowest and highest engaging portions 85, respectively; and that there is a lost motion before the steps 85 engage with the universal bar. This lost motion is always the same irrespective of the columnar position of the plungers 28. By an inspection of Figs. 4 and 6, it will be seen that the plunger 28 has been actuated to move the denominational stop 29 into the path of the column stop 30, to engage with the universal bar 35, to lift the rack 17 through the same distance out of engagement with the pinion 18.

To retain the denominational stops 29 in any one of their shifted positions, I have provided a locking bail 90, comprising a cross-bar 91, pivoted on a fulcrum-rod 92, supported by a bracket 93, said bail moving against the tension of a spring 94. Each of the bell cranks 68, associated with the column-selecting keys 67, is provided with a cam projection 95. Each cam projection coöperates with the cross-bar 91 of the locking bail, and performs a double function, thus to first lift the cross-bar 91 out of the path of the cam projection 95, associated with a previously depressed key 43, to permit the return of the latter, after which the bar is again permitted to drop, when the cam acts with the bail as a means to hold the bell crank in its actuated position. Thus the cam 72, associated with the depressed bell crank 68, will retain the fulcrum rod 27 in its shifted position, to retain the denominational stop 29 in any normal position to which it may be shifted.

The bell crank associated with the column "4" key is not provided with a cam 72, but is bent at its lower end, under the fulcrum-rod 27, to provide a finger 73, which acts as a stop against the fulcrum-rod 27, when the bell crank is in its normal position. The function of the column "4" key, while being depressed, is merely to release the previously depressed key, to permit the fulcrum 27 to be carried to its lowermost position, to locate the denomination stops 29 in their column "4" position.

The column-stop-bar 31 (Figs. 7 and 8) comprises two parallel bars 101 and 102, between which are held the column stops 30, in suitable slots. The two parallel bars are separated from each other, and held in relative position, so that the slots in which the column stops move are in perfect alinement, by T-shaped members 103, one at each end of the stop-bar 31. The stop-bar is held assembled by screws 104, which pass through holes in the bar 101 and the members 103, and are threaded into the bar 102.

To guide the denominational stops, or the upper ends of the plungers 28, two slotted T-shaped plates 105 are provided (Figs. 2 and 5), forming an elongated slot 106, and secured to the top of the tabulator bracket 77. The lower ends of the plungers 28, and also the rear ends of the key levers 26, are guided in slots 107 (Fig. 4), cut into the lower part of the tabulator bracket 77.

To add to the strength so as to guard against bending of the stops 29 and 30, when they engage with each other, I have provided each with a corrugation or reinforcing rib 109 and 108, on opposite sides of stops 29 and 30 respectively.

To give a brief description of the sequence of operations of my invention, let it be assumed that all of the column stops 30 are in their uppermost or neutral position, on the stop-bar 31, in which position none of the stops are effective.

Starting with the carriage at the extreme right, it is now moved in a letter-space direction until the first columnar position is reached. The column "1" key of the key-set device is now actuated, thus setting a column stop to the second uppermost position, by means of the finger 52, on the stop-setting element 47 (Fig. 9). The key-set mechanism is now restored to its normal position by the spring 46, acting on the key lever 44, and one of the springs 64, acting on the key-stem 61. This same operation is repeated, when the carriage is moved to the second, third and fourth columnar positions, by depressing the column "2", column "3" and column "4" keys respectively, (for last position see Fig. 10). Thus the column stops are set, each with its engaging portion in a lower level than the previously set column stops.

The column stops have now been arranged on the stop-bar, as indicated in Fig. 8, and the machine is ready for column-selecting. For this purpose, let it be assumed that the denominational stops 29 and the fulcrum rod 27 are in their lowermost position, and the column "4" key, in its actuated position, as indicated in Fig. 5. If one of the tabulator keys is now actuated, the denominational stop 29 will be raised into the path of the column stop 30, in the fourth columnar position. The carriage is now released, to permit the column stop 30 to engage with the denominational stop 29; the latter will at this time be out of range of the column stops, in the first, second and third columnar positions. The denominational position in the column at which the carriage is arrested, is dependent upon the tabulator key 25 actuated. If, after again returning the carriage to the right, it is now desired to position the carriage in the first columnar position, the column "1" key is depressed, thus lifting the fulcrum 27, by means of a cam 72 on the bell-crank lever 68, associated with the column "1" key of the column selecting mechanism, thereby swinging the key levers 26, about the fulcrum 74, in the guide plate 75, and raising the rear ends of said levers, to move the denominational stops to their uppermost or first columnar position, as indicated in Fig. 1. By the depression of the column "1" key, the locking bar 91 is raised through a sufficient distance, to permit the column "4" key to return to its normal position, but the bar is again forced downwardly by the spring 94, thus locking the column "1" key in its actuated position. If the tabulator key 25 is now depressed, the denominational stop 29 will be moved, through the same distance that it had previously been moved, when in the column "1" position, into the path of the selected column stop 30, after which the carriage is released to run until it is arrested by the column stop 30 and the denominational stop 29. In a like manner, the carriage may be positioned in the second and third columnar positions, by depressing the column "3" and column "4" keys, respectively.

It should be understood that, although I have shown only four stop-setting keys and a corresponding number of column-selecting keys, a greater number of both sets of keys may be employed.

Variations may be resorted to within the scope of the invention, and portions of the improvements may be used without others.

Having thus described my invention, I claim:

1. In a typewriting machine, the combination with a traveling carriage, of tabulating means therefor, comprising column-stops with their engaging portions arranged in stepped relation, a series of stops to coöperate with said column-stops, means to shift said coöperative stops, in a certain direction, to different preliminary positions, to determine the column-stop with which engagement is to be effected, and means to advance a selected coöperative stop, in the same direction as in its movement to the preliminary position, to engage the column-stop determined by the shifting means.

2. In a typewriting machine, the combination with a traveling carriage, of tabulating means therefor, comprising column-stops arranged with their engaging portions in stepped relation, a series of stops to coöperate with said column-stops, guiding means to limit said coöperative stops to rectilinear movement, means to move said coöperative stops to different preliminary positions to select the column-stop to be engaged, and means to move any of said coöperative stops from any one of said preliminary positions to a position to engage with the selected column-stop.

3. In a typewriting machine, the combination of a carriage, column stops on said carriage, coöperative stops each including a plunger and having both a normal and an abnormal position, a key lever for each coöperative stop effective through its plunger, a pivoted frame on which said key levers are pivoted, and means for varying the normal position of said coöperative stops by shifting said pivoted frame.

4. In a typewriting machine, the combination with a carriage, of column stops, a coöperative stop, means for actuating said coöperative stop, key-controlled means for varying the normal position of said coöperative stop, the movement of said coöperative stop, when actuated and shifted to another normal position, being in the same direction, and means for locking said key-controlled means, said key-controlled means being automatically releasable.

5. In a typewriting machine, the combination with a carriage, of column stops, a coöperative stop, means for actuating said coöperative stop, key controlled means comprising a series of cams for varying the normal position of said coöperative stop, and means coöperating with said key-controlled means for retaining said key-controlled means in any position to which it may be moved.

6. In a typewriting machine, the combination with a carriage, of column stops, a coöperative stop, a key lever for actuating said coöperative stop, a fulcrum for said key lever, means comprising a plurality of keys, a cam for each key, said cams engaging with said fulcrum to vary the normal position of said coöperative stop, and means engaging with said keys for retaining said fulcrum in any position to which it may be shifted.

7. In a typewriting machine, the combination with a carriage, column stops, a coöperative stop comprising the upper end of a plunger, and a pivoted key lever for actuating said plunger, of a column selector comprising a plurality of keys for varying the normal position of said plunger, and means for retaining said plunger-position-varying means in any position to which it may be shifted.

8. In a typewriting machine, the combination with a carriage, of column stops, a coöperative stop, a key, a fulcrum, means engaging with said fulcrum to vary the normal position of said coöperative stop, and means for retaining said fulcrum in any position to which it may be shifted.

9. In a typewriting machine, the combination with a carriage, of column stops, a coöperative stop, a key, a fulcrum, means comprising a plurality of cams engaging with said fulcrum to vary the normal position of said coöperative stop, and means for retaining said fulcrum in any position to which it may be shifted.

10. In a typewriting machine, the combination of a carriage, a series of column stops having stop portions out of line with one another, a series of denominational stops coöperating with said column stops, a series of key-levers for actuating said denominational stops, a support on which said levers are pivoted and means for shifting said support to any one of a plurality of positions, to bring the entire series of denominational stops into effective relation with any selected one of said stop portions of said column stops, said key-levers being effective to bring said denominational stops into the path of the selected column stop.

11. In a typewriting machine and tabulating mechanism, the combination of a carriage, column stops on said carriage, coöperative stops including plungers, key-levers effective on said plungers, a fulcrum for said key-levers, and means for varying the position of said fulcrum to move said coöperative stops to different preliminary positions, so that a key-lever when actuated will cause a coöperative stop to engage with different column stops, the column stops engaged being dependent upon the positions of said fulcrum and the corresponding preliminary positions of said coöperative stops.

12. In a typewriting machine and tabulating mechanism, the combination of a carriage, column stops on said carriage, a coöperative stop including a plunger, a key-lever for said coöperative stop effective on its plunger, and two keys for moving said key-lever, one of said keys being effective to move said key-lever to change the normal position of said coöperative stop, the other key being effective to move said key-lever to bring the coöperative stop into the path of said column stops.

13. In a typewriting machine, the combination of a carriage, a series of column stops having stop portions out of line with one another, a series of denominational stops coöperating with said column stops, plungers forming parts of said denominational stops, a series of key-levers effective on said plungers for actuating said denominational stops, a plurality of keys for moving said key-levers to change the normal positions of said denominational stops, and a second set of keys for moving said key-levers, to bring the denominational stops into the path of said column stops.

14. In a typewriting machine and tabulating mechanism, the combination of a carriage, a series of column stops having stop portions out of line with one another, a series of denominational stops coöperating with said column stops, plungers forming parts of said denominational stops, a series of key-levers effective on said plungers for actuating said denominational stops, and two sets of keys for actuating said key-levers, one set of keys being effective to shift said denominational stops to any one of a plurality of positions, to bring them into effective relation with any selected one of said stop portions of the column stops, the other set of keys being effective to bring said denominational stops into the path of the selected column stop.

15. In a typewriting machine and tabulating mechanism, the combination of a carriage, a series of column stops having stop portions out of line with one another, a coöperative stop, a plunger forming part of said coöperative stop, a key-lever for operating said coöperative stop through said plunger, said key-lever having two fulcrums, and two independent means for moving said key-lever, said key-lever, when moved about one fulcrum, being effective to move the coöperative stop to any one of a plurality of effective positions, and when moved about the other fulcrum being effective to bring said coöperative stop into the path of the selected column stop.

16. In a typewriting machine and tabulating mechanism, the combination of a carriage, a series of column stops having stop portions out of line with one another, a series of denominational stops coöperating with said column stops, plungers forming parts of said denominational stops, a series of levers for actuating said denominational stops through said plungers, said levers having two fulcrums, two sets of keys for moving said levers, said levers, when moved about one fulcrum, being effective to bring the entire series of denominational stops into effective relation with any selected one of said stop portions of said column stops, and said key-levers, when moved about the other fulcrum, being effective to bring said denominational stops into the path of the selected column stop.

17. In a typewriting machine and tabulating mechanism, the combination of a carriage, a series of column stops having stop portions out of line with one another, a series of denominational stops coöperative with said column stops, plungers forming parts of said denominational stops, a series of levers for actuating said denominational stops through said plungers, a fixed and a shiftable fulcrum for said levers, and two independent keys for actuating said levers, said levers, when moved about the fixed fulcrum, being effective to bring the entire series of denominational stops into effective relation with any selected one of said stop portions of said column stops, and said key-levers, when moved about said shiftable fulcrum, being effective to bring said denominational stops into the path of the selected column stop.

18. In a typewriting machine and tabulating mechanism, the combination of a carriage, a series of column stops having stop portions out of line with one another, a coöperative stop, a plunger forming part of said coöperative stop, and a lever for actuating said coöperative stop through said plunger, said lever being used as a lever of the first or third order, said lever, when used as a lever of the third order, being effective to bring the coöperative stop into effective relation with any selected one of said stop portions of said column stops, and when used as a lever of the first order, being effective to bring said coöperative stop into the path of the selected column stop.

19. In a typewriting machine, the combination of a carriage, a series of column stops having stop portions out of line with one another, a series of denominational stops coöperating with said column stops, plungers forming parts of said denominational stops, a series of levers for actuating said denominational stops through said plungers, and two independent means for actuating said levers, said levers being used as levers of the first and third orders, said levers, when used as levers of the third order, being effective to bring the entire series of denominational stops into effective relation with any selected one of said stop portions of said column stops, and said levers, when used as levers of the first order, being effective to bring said denominational stops into the path of the selected column stop.

20. In a typewriting machine, the combination of a carriage, column stops on said carriage, denominational stops coöperating with said column stops, carriage-releasing means comprising a universal bar, and column-selecting means for varying the normal positions of said denominational stops and for shifting said universal bar.

21. In a typewriting machine, the combination of a carriage, column stops on said carriage, a series of key-actuated elements comprising denominational stops and a plurality of stepped engaging portions, carriage-releasing means comprising a universal bar, and column-selecting means comprising a connection to said universal bar for shifting the latter into engagement with any one of said stepped engaging portions.

22. In a typewriting machine, the combination of a carriage, column stops on said carriage, a series of plungers comprising denominational stops, each plunger being provided with a plurality of stepped engaging portions, means for actuating said plungers, carriage-releasing means comprising a universal bar, and column-selecting means comprising a connection to said universal bar for shifting the latter into coöperative relation with any one of said stepped engaging portions.

23. In a typewriting machine, the combination of a carriage, a series of column stops on said carriage, a series of plungers comprising denominational stops, each plunger being provided with a plurality of stepped engaging portions, a series of key-levers for actuating said plungers, a pivoted frame, said key-levers being fulcrumed on said pivoted frame, carriage-releasing means comprising a universal bar, column-selecting means, and means connected to said pivoted frame for shifting said universal bar into coöperative relation with any one of said stepped engaging portions.

24. In a typewriting machine, the combination of a carriage, a series of column stops on said carriage, a series of key-actuated elements comprising denominational stops, each key-actuated element being provided with a plurality of stepped engaging portions, carriage-releasing means comprising a universal bar, column-selecting means comprising a connection to said universal bar, for shifting the latter into coöperative relation with any one of said stepped engaging portions, and means for retaining said universal bar in said coöperative relation.

25. In a typewriting machine, the combination of a carriage, a series of column stops on said carriage, a series of key-actuated elements comprising denominational stops, each key-actuated element being provided with a plurality of stepped engaging portions, carriage-releasing means comprising a universal bar, column-selecting means comprising a connection to said universal bar, for shifting the latter into coöperative relation with any one of said stepped engaging portions, means for retaining said universal bar in said coöperative relation, and means for releasing said retaining means.

JOHN WALDHEIM.

Witnesses:
   ARTHUR A. JOHNSON,
   EDITH B. LIBBEY.